H. BORGEN AND G. W. WADSWORTH.
APPARATUS FOR MAKING MARGARINE COMPOUNDS AND OTHER SUBSTANCES.
APPLICATION FILED MAR. 12, 1921.
1,418,357.
Patented June 6, 1922.
2 SHEETS—SHEET 1.
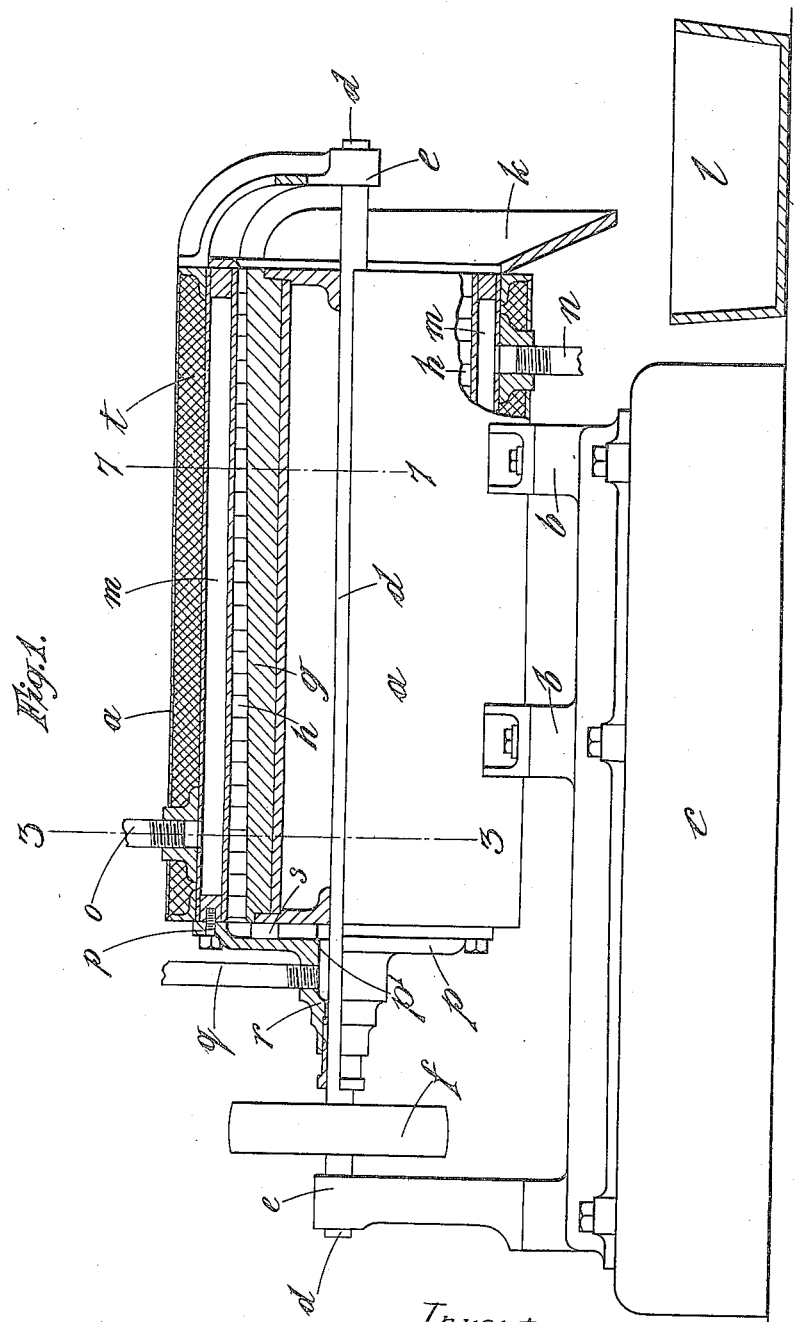

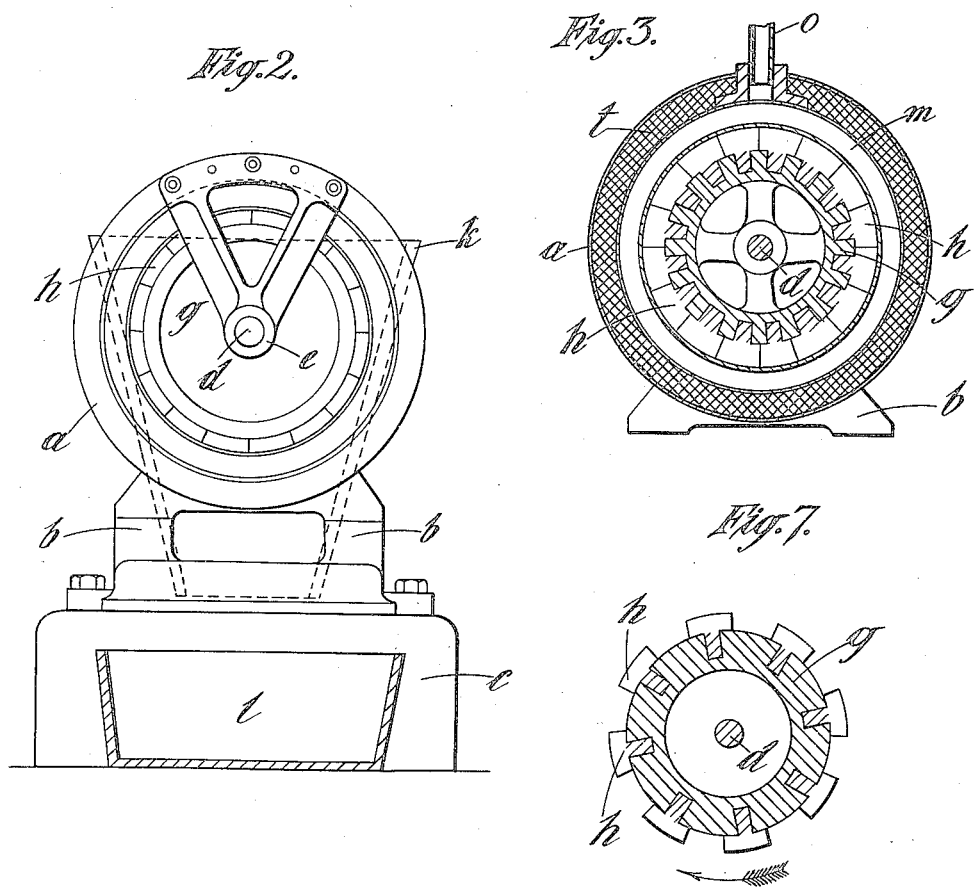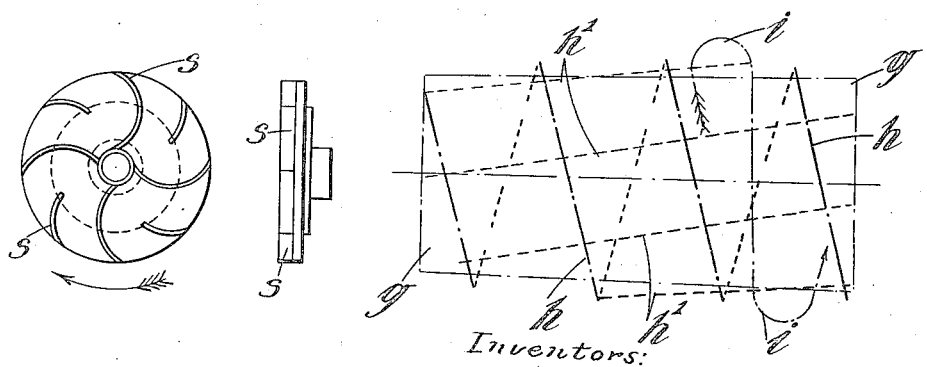

UNITED STATES PATENT OFFICE.

HAROLD BORGEN, OF URMSTON, AND GEORGE WILFRID WADSWORTH, OF FLIXTON, ENGLAND.

APPARATUS FOR MAKING MARGARINE COMPOUNDS AND OTHER SUBSTANCES.

1,418,357. Specification of Letters Patent. Patented June 6, 1922.

Application filed March 12, 1921. Serial No. 451,922.

*To all whom it may concern:*

Be it known that we, HAROLD BORGEN, a subject of the King of Denmark, and GEORGE WILFRID WADSWORTH, a subject of the King of Great Britain, residing, respectively, at Urmston, Lancashire, England, and Flixton, Lancashire, England, have invented certain new and useful Improvements in the Apparatus for Making Margarine Compounds and Other Substances, of which the following is a specification, reference being had therein to the accompanying drawing.

This invention relates to the production of margarine and other substances or compounds such as artificial lard and the like from emulsion or liquid ingredients and has for its object the conversion of the emulsion or liquid ingredients into a commercial product—for example margarine or compounds in a continuous manner without subjecting the same to the heretofore adopted treatment for under-cooling and re-heating.

According to this invention the requisite ingredients are fed into a converter comprising a drum or cylindrical vessel having mounted therein a rotary device adapted to propel or force the emulsion or liquid ingredients through the vessel while subjecting the same to an agitating beating and kneading action so as to churn or convert it into a solid consistency. The vessel is jacketed and a cooling medium is caused to circulate through the jacket and the supply of emulsion or ingredients being continuous the passage through the machine is quickly effected, the arrangement of the rotary device enabling the delivery of the product to be continuous. To this end the said rotary device comprises a number of fins or blades arranged spirally or in the form of a screw along the surface of a rotor whereof the surface is tapered or conical so that the said fins or blades are deeper or of greater area where they first act on the emulsion or ingredients.

By the improved method of manufacture in which is combined in a continuous manner the present intermittent processes of agitating cooling kneading and blending a great saving of time and labour is effected with the prevention of the attendant unavoidable waste.

Salt preservative flavouring or other essences or materials may be added to the emulsion or ingredients either before or during conversion or the said materials may be mixed separately with the finished product in ordinary blending machines.

In order that the said invention may be readily understood and carried into effect we will now proceed to describe the same more fully with reference to the exemplary embodiment thereof illustrated in the accompanying drawings in which:—

Figure 1 is a view of the machine the upper half being in longitudinal section and the lower half in elevation.

Figure 2 is an elevation of the delivery end of the machine.

Figure 3 is a transverse section taken along the line 3—3 in Figure 1.

Figures 4 and 5 are a face and side view respectively of the rotary device for impelling the emulsion or mixture forward to the action of the converter.

Figure 6 is a diagrammatic view of a portion of the conical rotor illustrating the arrangement of the fins or blades thereon.

Figure 7 is a transverse section or end view corresponding with Figure 6 the section being assumed to be approximately on the line 7—7, in Figure 1.

The converter $a$ is formed as a drum or cylinder and carried in supports $b\ b$ mounted on a base $c$. Passing centrally through the drum or cylinder $a$ is a shaft $d$ which is mounted in bearings $e\ e$ and provided with a pulley $f$ whereby the same may be rotated from any suitable or convenient source of motive power. Within the drum and mounted upon the shaft $d$ so as to rotate therewith is a rotor $g$ having a number of fins or blades $h$ projecting from its surface the said fins or blades being arranged so as to constitute a spiral or screw like form and as will be seen on reference to the drawing graduating downwards in size from the entering end to the delivery end of the machine. The arrangement of the fins will be best understood by reference to the diagrammatic view Figure 6 in which it will be seen that the fins $h$ are arranged in a spiral line about the circumference of the conical rotor $g$ and that they also lie in longitudinal spirals indicated by the dotted lines $h^1$. Thus the fins or blades $h$ of the several series overlap or break joint with the fins or blades of adjacent series so that upon the rotor moving in the direction of the arrow $i$ a continuous action is exerted upon the emulsion or liquid ingredients the said fins or blades having the effect of agitating beating kneading or churning the emulsion while simultaneously therewith it is forced forward towards the exit or delivery aperture where it falls into the guide or chute $k$ and is deposited in the receptacle $l$ placed to receive it.

The rotor $g$ with its fins or blades $h$ works in a circular chamber in the vessel $a$ and the outer edes of the blades touch or nearly touch the adjacent walls of the said chamber which latter is constituted by the jacket $m$. The jacket is in communication with a circulating supply of cooling medium the inlet $n$ therefor being at the lower side of the drum and the exit $o$ at the upper side thereof.

It will be understood that the delivery aperture is really constituted by a circular slit or opening. The entering end of the drum is provided with a cover $p$ which is adapted to receive the emulsion or ingredients by means of a pipe $q$ hopper or other convenient device and the joint between the cover $p$ and the shaft $d$ is maintained fluid tight by means of a stuffing box $r$. A space $p^1$ is formed within the cover and about the shaft $d$ and the emulsion or ingredients thereof upon leaving the supply pipe $q$ enters or enter the said space and is or are caught by the blades $s$ provided on the adjacent end of the rotor $g$ whereby the emulsion or ingredients is or are impelled towards the fins or blades $h$ of the rotor to be churned or acted upon as hereinbefore described in the space formed between the conical surface of the rotor $g$ and the inner wall of the jacket $m$.

The material to be converted receives the necessary churning and kneading while under the influence of the cooling medium in the jacket $m$ and is delivered as a finished product at the outlet or delivery end of the vessel.

By arranging the inlet and outlet for the cooling medium as described and shewn the fullest effect is secured as the coolest medium is always entering the jacket at the delivery end of the vessel. The latter may be provided with a lagging or insulation $t$ so as to maintain the cooling effect of the jacket.

The fins or blades being arranged so that those of one series break joint with those of adjacent series or so that the blades of one series are opposite the spaces separating the blades of adjacent series and the outer edges of the blades coinciding with the next succeeding blade in adjacent series ensure the said fins or blades being in spiral alignment. The depth of the fins or blades vary with the surface of the rotor $g$ the depth being greatest at the inlet end of the vessel and smallest at the outlet end thereof.

It will be understood that the number and disposition of the fins or blades will be governed by the capacity of the machine—the size of the vessel the temperature of the cooling medium and other contingencies. The lower the temperature in the drum the quicker the mass can be forced through the machine and the greater the number of fins or blades so likewise the greater the speed at which the said forcing can be accomplished. Similarly the speed of the machine will be found to regulate the number of fins that can be used advantageously. The speed of the machine moreover requires to be modified according to the consistency of the mass being forced or pushed through. The fins or blades may be made of wood or of metal. They may be stamped or formed up from sheet or other metal or be produced by casting. The arrangement is such however that whatever their number and method of production they form a kind of screw with the edges of which blade overlapping the edges of those in advance and in rear. The setting of the blades will therefore depend upon the capacity and speed of working required and they may advantageously occupy the whole length of the vessel constituting thereby a continuous rotary beater cutter or kneader whereof the blades are arranged in zig-zag spiral formation.

The material or emulsion is fed or passed into the vessel in sufficient volume or quanity to maintain a constant flow and so keep the vessel filled and the degree to which the cooling is brought is determined by the temperature at which it is desired the product should leave the machine.

The speed at which the material is forced through the machine may be varied by varying the pitch of the blades or the cone of the rotor or both as well as the frequency of the fins or blades and the spiral assumed thereby on the conical surface of the rotor.

In operation the device acts to beat and knead the material to throw it forward and outwards against the inner surface of the vessel where it undergoes the cooling influence of the jacketed walls. The emulsion or material is thus cooled to a predetermined temperature without under-cooling and may preferably acquire the temperature of the finished product the action referred to being rapid and resulting in the conversion of the mass into a product of even texture and great firmness.

According to the invention the development of bacteria in the margarine is not arrested and the proportion of fat and water in the emulsion is not subject to alteration in the finished product. The quality of the latter is also under control and owing to the continuous treatment in which simultaneous kneading and cooling are effected a uniform smooth firm and even mass results.

If desired the machine may be constructed in two halves so as to facilitate taking apart for cleaning inspection repairs and the like, and may be designed to work either in a vertical or horizontal position.

Obviously the machine is applicable for employment advantageously in the treatment of materials other than margarine emulsion for instance such as in the preparation or manufacture of artificial lard and other compounds.

We claim:—

1. In apparatus for manufacturing margarine and other substances or compounds from emulsion or liquid ingredients, the combination with a stationary jacketed cylindrical vessel, of a rotating beating, kneading and propelling device composed of fins arranged in broken spiral formation and graduated in depth from the entering to the delivering end of said vessel.

2. In apparatus for manufacturing margarine and other substances or compounds from emulsion or liquid ingredients, the combination with a stationary jacketed cylindrical vessel, of a conical rotor in said vessel and fins on said rotor arranged in broken spiral formation so as to overlap and break joint with adjacent fins in front and in rear and graduated in depth from the entering to the delivering end of said vessel.

3. In apparatus for manufacturing margarine and other substances or compounds from emulsion or liquid ingredients, the combination with a stationary jacketed cylindrical vessel of a rotating beating, kneading and propelling device composed of fins arranged in broken spiral formation and graduated in depth from the entering to the delivering end of said vessel an end cover having a central space for receiving the emulsion and a centrifugal forcing device in operative relation to said space and adapted to co-operate with the rotating beating, kneading and propelling device.

4. In apparatus for manufacturing margarine and other substances or compounds from emulsion or liquid ingredients the combination with a stationary jacketed cylindrical vessel, of a conical rotor in said vessel fins on said rotor arranged in broken spiral formation so as to overlap and break joint with adjacent fins in front and in rear and graduated in depth from the entering to the delivering end of the said vessel, a cover at one end of said vessel, a central space in said cover for receiving the emulsion prior to its passing into the cylindrical vessel and a forcing device on the adjacent end of the rotor comprising blades adapted to co-operate with the rotating beating, kneading and propelling device to impel the emulsion thereto.

5. In apparatus for manufacturing margarine and other substances or compounds from emulsion or liquid ingredients the combination with a stationary jacketed cylindrical vessel of a rotating beating, kneading and propelling device composed of fins arranged in broken spiral formation and graduated in depth from the entering to the delivering end of the vessel, an end cover to said vessel having a central space for receiving the emulsion, a centrifugal forcing device in operative relation to said space and adapted to co-operate with the rotating beating, kneading and propelling device, an inlet for cooling medium at the lower side near the delivering end of the vessel and an outlet for said medium at the upper side near the entering end of the said vessel.

6. In apparatus for manufacturing margarine and other substances or compounds from emulsion or liquid ingredients the combination with a stationary jacketed cylindrical vessel, of a conical rotor in said vessel, fins on said rotor arranged in broken spiral formation so as to overlap and break joint with adjacent fins in front and in rear and graduated in depth from the entering to the delivering end of the said vessel, a cover at one end of said vessel, a central space in said cover for receiving the emulsion prior to same passing into the cylindrical vessel a forcing device on the adjacent end of the rotor comprising blades adapted to co-operate with the rotating beating, kneading and propelling device to impel the emulsion thereto an inlet for cooling medium at the lower side of the vessel near the delivering end and an outlet for said medium at the upper side near the entering end of the said vessel.

7. In apparatus for manufacturing margarine and other substances or compounds from emulsion or liquid ingredients, the combination with the stationary jacketed cylindrical vessel, of a rotating beating, kneading and propelling device comprising a conical rotor and series of fins arranged in spiral lines about the circumference of said rotor and also lying in longitudinal spirals thereon so that the fins of the several series overlap and break joint with the fins of adjacent series and constitute a continuously operative screw agitating, beating, kneading, turning and propelling rotor.

HAROLD BORGEN.
GEORGE WILFRID WADSWORTH.

Witnesses:
JOHN ROBERT BURY,
JOHN THOMAS SIDEBOTHAM.